(12) United States Patent
Yamamoto et al.

(10) Patent No.: US 12,140,840 B2
(45) Date of Patent: Nov. 12, 2024

(54) LIGHT CONTROL SHEET AND METHOD OF PRODUCING LIGHT CONTROL SHEET

(71) Applicant: TOPPAN Inc., Taito-ku (JP)

(72) Inventors: Tatsuya Yamamoto, Taito-ku (JP); Takashi Oonishi, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 0 days.

(21) Appl. No.: 18/317,952

(22) Filed: May 16, 2023

(65) Prior Publication Data
US 2023/0280621 A1    Sep. 7, 2023

Related U.S. Application Data

(63) Continuation of application No. PCT/JP2021/042263, filed on Nov. 17, 2021.

(30) Foreign Application Priority Data

Nov. 17, 2020    (JP) ................................. 2020-191232

(51) Int. Cl.
*G02F 1/1343*    (2006.01)
*G02F 1/1339*    (2006.01)

(52) U.S. Cl.
CPC ...... *G02F 1/13439* (2013.01); *G02F 1/13396* (2021.01)

(58) Field of Classification Search
CPC ........................ G02F 1/13439; G02F 1/13396
See application file for complete search history.

(56) References Cited

U.S. PATENT DOCUMENTS 6,774,970 B1    8/2004 Sekiguchi et al.
2007/0002261 A1*    1/2007 Lee ..................... G02F 1/13392
349/155

(Continued)

FOREIGN PATENT DOCUMENTS

CN    110554529 A    12/2019
CN    210666261 U    6/2020

(Continued)

OTHER PUBLICATIONS

International Search Report issued Feb. 8, 2022 in International Application No. PCT/JP2021/042263 filed Nov. 17, 2021, 5 pages (with English Translation).

(Continued)

*Primary Examiner* — Nathanael R Briggs
(74) *Attorney, Agent, or Firm* — Oblon, McClelland, Maier & Neustadt, L.L.P.

(57) ABSTRACT

A light control sheet includes transparent electrode layers including first and second transparent electrode layers, a light control layer formed between the first and second transparent electrode layers, a first transparent support layer formed on the first transparent electrode layer on the opposite side of the light control layer, and a second transparent support layer formed on the second transparent electrode layer on the opposite side of the light control layer. The first transparent support layer has a support surface supporting the first transparent electrode layer, and the first transparent electrode layer includes a first electrode element and a second electrode element such that the first and second electrode elements are formed along the support surface and electrically insulated from each other by a groove extending along the support surface and having a depth passing through the first transparent electrode layer and not passing through the first transparent support layer.

20 Claims, 5 Drawing Sheets

(56) References Cited

U.S. PATENT DOCUMENTS

| | | | | |
|---|---|---|---|---|
| 2012/0105759 A1* | 5/2012 | Park | ................... | G02F 1/13392 |
| | | | | 349/155 |
| 2014/0132909 A1 | 5/2014 | Wardhana et al. | | |
| 2019/0129259 A1 | 5/2019 | Ishitani et al. | | |

FOREIGN PATENT DOCUMENTS

| | | | |
|---|---|---|---|
| JP | H05-173159 A | | 7/1993 |
| JP | 2008-76434 A | | 4/2008 |
| JP | 2018-045135 A | | 3/2018 |
| JP | 2020-3644 A | | 1/2020 |
| KR | 10-2019-0023522 A | | 3/2019 |
| KR | 20190023522 A | * | 3/2019 |

OTHER PUBLICATIONS

Office Action issued May 15, 2022 in corresponding Japanese Patent Application No. 2020-191232, filed Nov. 17, 2020, 5 pages (with English Translation).

Extended European Search Report issued on Apr. 25, 2024 in European Patent Application No. 21894693.7, 12 pages.

\* cited by examiner

LIGHT CONTROL SHEET AND METHOD OF PRODUCING LIGHT CONTROL SHEET

CROSS-REFERENCE TO RELATED APPLICATIONS

The present application is a continuation of International Application No. PCT/JP2021/042263, filed Nov. 17, 2021, which is based upon and claims the benefits of priority to Japanese Application No. 2020-191232, filed Nov. 17, 2020. The entire contents of all of the above applications are incorporated herein by reference.

BACKGROUND OF THE INVENTION

Field of the Invention

The present disclosure relates to a light control sheet having a variable light transmittance, and a method of producing the light control sheet.

Description of Background Art

A light control sheet includes a light control layer containing a liquid crystal composition, and a pair of transparent electrode layers sandwiching the light control layer. A drive voltage is applied between the pair of transparent electrode layers. The alignment of liquid crystal molecules of the liquid crystal composition changes according to a potential difference between the transparent electrode layers, leading to a change in light transmittance of the light control sheet. For example, when the major axes of the liquid crystal molecules are aligned in the thickness direction of the light control layer, the light control sheet is colorless and transparent, and has a high light transmittance. When the major axes of the liquid crystal molecules intersect the thickness direction of the light control layer, light is scattered in the light control layer, and the light transmittance of the light control sheet is low (see, for example, JP 2018-45135 A). The entire contents of this publication are incorporated herein by reference.

SUMMARY OF THE INVENTION

According to one aspect of the present invention, a light control sheet includes transparent electrode layers including a first transparent electrode layer and a second transparent electrode layer, a light control layer formed between the first transparent electrode layer and the second transparent electrode layer, a first transparent support layer formed on the first transparent electrode layer on the opposite side with respect to the light control layer, and a second transparent support layer formed on the second transparent electrode layer on the opposite side with respect to the light control layer. The first transparent support layer has a support surface supporting the first transparent electrode layer, and the first transparent electrode layer includes a first electrode element and a second electrode element such that the first electrode element and the second electrode element are formed along the support surface of the first transparent support layer and electrically insulated from each other by a groove extending along the support surface of the first transparent support layer and having a depth passing through the first transparent electrode layer and not passing through the first transparent support layer.

According to another aspect of the present invention, a method of producing a light control sheet includes preparing a first laminate including a first transparent support layer and a first transparent electrode layer, preparing a second laminate including a second transparent support layer and a second transparent electrode layer, making a slit in the first transparent electrode layer and the first transparent support layer such that a first electrode element and a second electrode element formed by a groove in the first transparent electrode layer, and forming a light control layer between the first laminate including the first transparent support layer and the first transparent electrode layer and the second laminate including the second transparent support layer and the second transparent electrode layer. The first transparent electrode layer is supported by the first transparent support layer, the second transparent electrode layer is supported by the second transparent support layer, and the slit is made in the first transparent electrode layer and the first transparent support layer from a side where the first transparent electrode layer is formed such that the groove has a depth passing through the first transparent electrode layer and not passing through the first transparent support layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
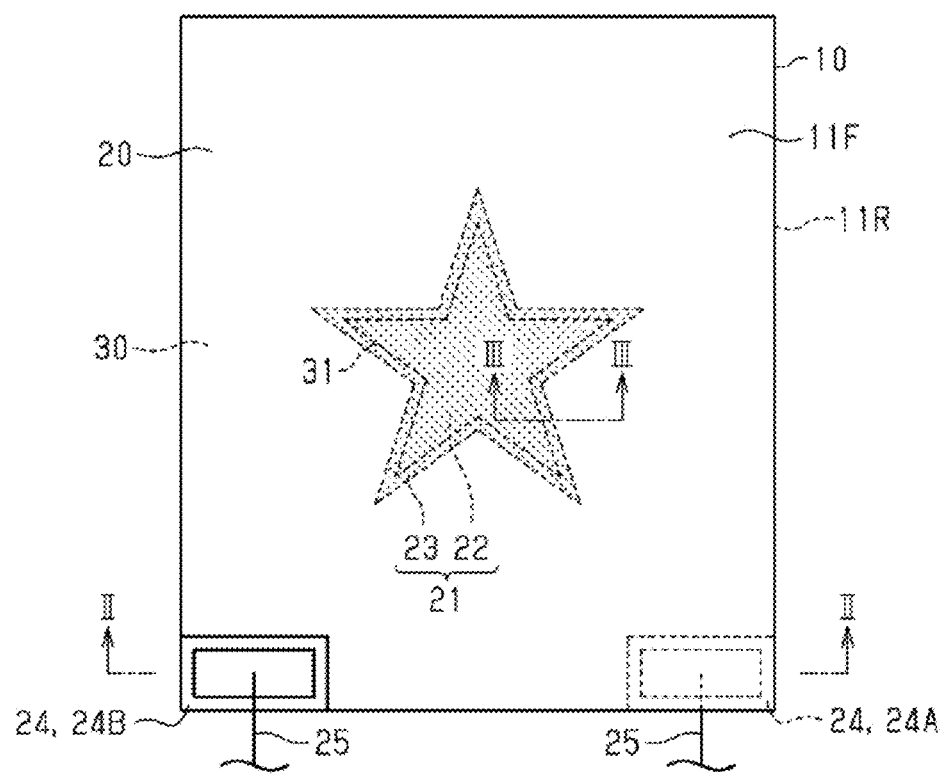
FIG. 1 is a front view of a normal-type light control sheet according to an embodiment of the present invention.

Embodiments will now be described with reference to the accompanying drawings, wherein like reference numerals designate corresponding or identical elements throughout the various drawings.

Embodiments of a light control sheet and a method of producing the light control sheet will be described with reference to FIGS. 1 to 6. A light control sheet 10 of the present embodiment is a normal-type light control sheet in which when no voltage signal is applied to the light control sheet 10, incident light in a region to be driven is scattered to reduce the translucency of the light control sheet 10 and when a voltage signal is applied to the light control sheet 10, the translucency of the light control sheet 10 is increased.

Light Control Sheet

As shown in FIG. 1, the light control sheet 10 has a first surface 11F, and a second surface 11R opposite to the first surface 11F. The light control sheet 10 has a drive region 20 and a non-driven region 21.

The drive region 20 is a region in which a driving electrode element 30 is located. The driving electrode element 30 is an electrode element to which a voltage signal is applied when the light control sheet 10 is driven. The light transmittance of the drive region 20 changes according to the application state of a voltage signal to the driving electrode element 30. The driving electrode element 30 is an example of a first electrode element.

The non-driven region 21 includes a floating region 22, and a boundary region 23 that surrounds the floating region 22. The floating region 22 is a region in which a floating electrode element 31 is located. The floating electrode element 31 is an electrode element to which no voltage signal is applied when the light control sheet 10 is driven. The floating electrode element 31 is an example of a second electrode element. The boundary region 23 is located between the drive region 20 and the floating region 22, and has a closed frame shape surrounding the floating region 22. No electrode element is located in the boundary region 23. The light transmittance of the non-driven region 21 does not change in response to the light control sheet 10 being driven or not driven.

The non-driven region 21 causes the light control sheet 10 to display a design. The design is, for example, a character, a number, a symbol, a figure, a pattern, a patterned design, or the like, or a combination thereof. The light control sheet 10 shown in FIG. 1 is configured to display a single star-shaped figure; however, the light control sheet 10 may have multiple non-driven regions 21 separated from each other. That is, the light control sheet 10 may have multiple boundary regions 23 each of which forms a closed region.

A connection region 24 is a region for applying a voltage signal to the drive region 20, and external wires 25 are connected to the connection region 24. The connection region 24 and the drive region 20 are adjacent to each other. The position in the light control sheet 10 where the connection region 24 is to be provided is not particularly limited. The connection region 24 is located, for example, in a corner portion of the light control sheet 10.

Figure 2:
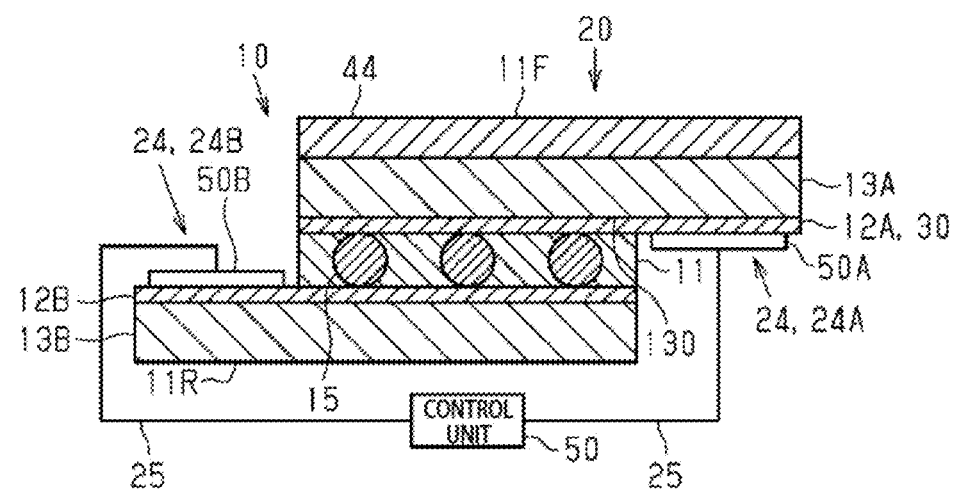
FIG. 2 is a cross-sectional view of a light control sheet according to an embodiment of the present invention.

FIG. 2 is a cross-sectional view taken along line II-II in FIG. 1. That is, FIG. 2 shows a cross-sectional structure of the light control sheet 10 in the drive region 20 and the connection region 24. The thickness ratio of the layers in FIG. 2 is shown for convenience of description, and the thickness ratio of the layers is not limited to the thickness ratio shown in FIG. 2.

As shown in FIG. 2, the light control sheet 10 includes a light control layer 11, a first transparent electrode layer 12A, a second transparent electrode layer 12B, a first transparent support layer 13A, and a second transparent support layer 13B. The light control layer 11 is sandwiched between the first transparent electrode layer 12A and the second transparent electrode layer 12B. The first transparent support layer 13A supports the first transparent electrode layer 12A by a support surface 130 on the side of the first transparent electrode layer 12A facing away from the light control layer 11. The second transparent support layer 13B supports the second transparent electrode layer 12B on the side of the second transparent electrode layer 12B facing away from the light control layer 11. The light control layer 11 may have a single-layer structure or a multilayer structure. The light control layer 11 having a multilayer structure may include a functional layer having a light control function, a thin layer for improving adhesion between the functional layer and the first transparent electrode layer 12A, and a thin layer for improving adhesion between the functional layer and the second transparent electrode layer 12B.

The light control sheet 10 further includes a protective layer 44. The protective layer 44 is located on the side of the first transparent support layer 13A facing away from the first transparent electrode layer 12A. The protective layer 44 is fixed to the first transparent support layer 13A via an adhesive layer (not shown).

The first surface 11F of the light control sheet 10 is a surface opposite to a surface of the protective layer 44 facing the first transparent support layer 13A. The second surface 11R of the light control sheet 10 is a surface opposite to a surface of the second transparent support layer 13B facing the second transparent electrode layer 12B. The second surface 11R is adhered to a transparent plate made of glass, resin, or the like via an adhesive layer (not shown). The transparent plate is, for example, a window glass of various buildings such as houses, stores, stations, and airports, a partition in offices, a display window in stores, or a window glass or a windshield of moving objects such as vehicles and aircraft. The transparent plate may have a flat surface or a curved surface.

The connection region 24 includes a first connection region 24A that is connected to an external wire 25 for applying a voltage signal to the first transparent electrode layer 12A, and a second connection region 24B that is connected to an external wire 25 for applying a voltage signal to the second transparent electrode layer 12B.

The first connection region 24A is a region that does not include the light control layer 11, the second transparent electrode layer 12B, or the second transparent support layer 13B and in which the first transparent electrode layer 12A is exposed. A first terminal portion 50A is connected to the first transparent electrode layer 12A exposed in the first connection region 24A. That is, the driving electrode element 30 extends from the drive region 20 to the first connection region 24A, and the first terminal portion 50A is connected to the driving electrode element 30 in the first connection region 24A.

The second connection region 24B is a region that does not include the light control layer 11, the first transparent electrode layer 12A, the first transparent support layer 13A, or the protective layer 44 and in which the second transparent electrode layer 12B is exposed. A second terminal portion 50B is connected to the second transparent electrode layer 12B exposed in the second connection region 24B. That is, the driving electrode element 30 extends from the drive region 20 to the second connection region 24B, and the second terminal portion 50B is connected to the driving electrode element 30 in the second connection region 24B.

One of the external wires 25 extends from the first terminal portion 50A and the other external wire 25 extends from the second terminal portion 50B, and the external wires 25 are connected to the control unit 50. The control unit 50 applies a voltage signal to the driving electrode element 30 of the first transparent electrode layer 12A through the first terminal portion 50A, and applies a voltage signal to the second transparent electrode layer 12B through the second terminal portion 50B. Thus, the control unit 50 controls a potential difference between the first transparent electrode layer 12A and the second transparent electrode layer 12B in the drive region 20. The second transparent electrode layer 12B is controlled to have, for example, a ground potential. The light control sheet 10 and the control unit 50 constitute a light control device.

The light control layer 11 includes a transparent polymer layer and a liquid crystal composition. The transparent polymer layer has voids in which the liquid crystal composition is filled. The liquid crystal composition is filled in the voids of the transparent polymer layer. The liquid crystal composition contains liquid crystal molecules. The liquid crystal composition may be made of a known material. The liquid crystal molecules are, for example, selected from the group of those based on Schiff bases, azo types, azoxy types, biphenyls, terphenyls, benzoic acid esters, tolans, pyrimidines, cyclohexanecarboxylic acid esters, phenylcyclohexanes, and dioxanes. The light control layer 11 having a single-layer structure is composed of only a functional layer including a transparent polymer layer and a liquid crystal composition.

The liquid crystal composition is held in one of a polymer network type, a polymer dispersion type, and a capsule type. The polymer network type has a three-dimensional mesh transparent polymer network. Voids of the mesh communicate with each other, and a liquid crystal composition is held in the voids. The polymer network is an example of a transparent polymer layer. The polymer dispersion type has a large number of isolated voids in a transparent polymer layer, and holds a liquid crystal composition in the voids dispersed in the polymer layer. The capsule type holds an encapsulated liquid crystal composition in a transparent polymer layer. The liquid crystal composition may contain a monomer for forming a transparent polymer layer, dichroic dye, and the like, in addition to the liquid crystal molecules described above.

The first transparent electrode layer 12A and the second transparent electrode layer 12B are each conductive and transparent to light in the visible region. The first transparent electrode layer 12A and the second transparent electrode layer 12B may be made of a known material.

Examples of the material for forming the first transparent electrode layer 12A and the second transparent electrode layer 12B include indium tin oxide, fluorine-doped tin oxide, tin oxide, zinc oxide, carbon nanotubes, and poly(3,4-ethylenedioxythiophene).

The first transparent support layer 13A and the second transparent support layer 13B are each a substrate transparent to light in the visible region. The first transparent support layer 13A and the second transparent support layer 13B may be made of a known material. The material for forming the first transparent support layer 13A and the second transparent support layer 13B may be, for example, a synthetic resin or an inorganic compound. Examples of the synthetic resin include polyester, polyacrylate, polycarbonate, and polyolefin. Examples of the polyester include polyethylene terephthalate and polyethylene naphthalate. The polyacrylate may be, for example, polymethyl methacrylate or the like. Examples of the inorganic compound include silicon dioxide, silicon oxynitride, and silicon nitride.

The first terminal portion 50A and the second terminal portion 50B each include, for example, a conductive adhesive layer and a circuit board. The conductive adhesive layer is composed of, for example, an anisotropic conductive film (ACF), an anisotropic conductive paste (ACP), an isotropic conductive film (ICF), an isotropic conductive paste (ICP), or the like. The circuit board may be, for example, a flexible printed circuit (FPC).

Alternatively, the first terminal portion 50A and the second terminal portion 50B each may have a structure in which a conductive material such as a conductive tape is joined to the external wire 25 by soldering or the like.

In the drive region 20, a change in the voltage generated between the two transparent electrode layers 12A and 12B causes a change in the alignment of the liquid crystal molecules in the light control layer 11. The change in the alignment of the liquid crystal molecules leads to a change in the degree of scattering, degree of absorption, and degree of transmission of visible light incident on the light control layer 11. Specifically, when no voltage signal is applied to the first transparent electrode layer 12A or the second transparent electrode layer 12B in the drive region 20, the major axes of the liquid crystal molecules are oriented in random directions. This leads to a high degree of scattering of light incident on the light control layer 11, causing the drive region to appear turbid. That is, the drive region 20 is opaque when no voltage signal is applied to the light control layer 11. On the other hand, when a voltage signal is applied to the transparent electrode layers 12A and 12B, and a potential difference with a predetermined value or more occurs between the first transparent electrode layer 12A and the second transparent electrode layer 12B, the liquid crystal molecules are aligned, and the major axes of the liquid crystal molecules are aligned in the direction of an electric field between the transparent electrode layers 12A and 12B. Thus, light is more likely to be transmitted through the light control layer 11, and the drive region 20 is transparent.

Figure 3:
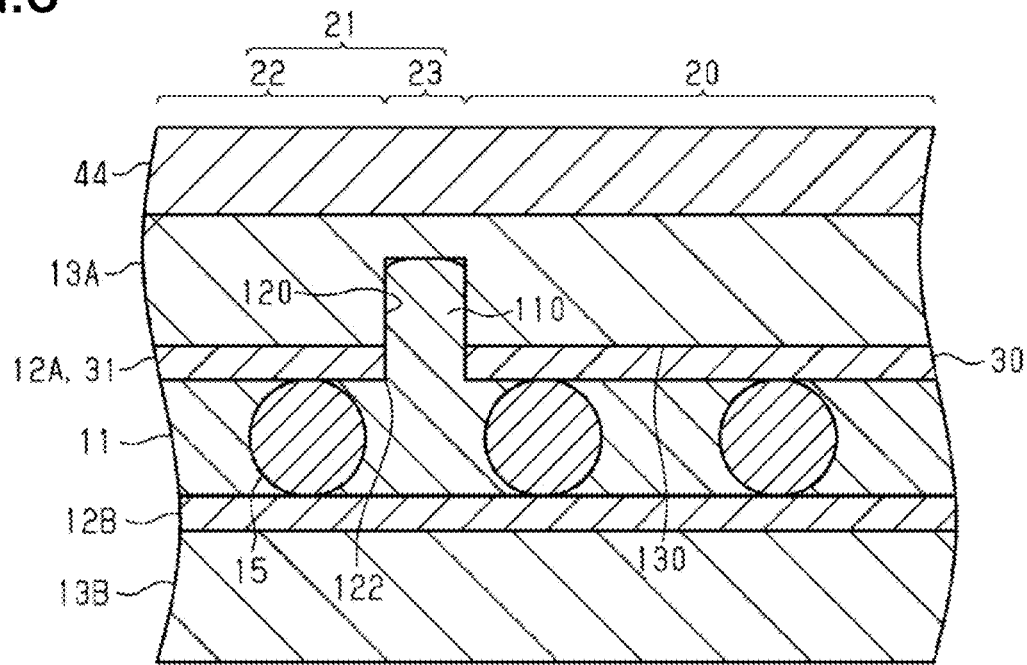
FIG. 3 is a cross-sectional view of a light control sheet according to an embodiment of the present invention.

FIG. 3 is a cross-sectional view taken along line III-III in FIG. 1 and shows a cross-sectional structure of the light control sheet 10 in the boundary region 23 and in the drive region and the floating region 22 between which the boundary region 23 is located.

As shown in FIG. 3, the light control layer 11 includes multiple spacers 15. The spacers maintain an approximately constant distance between the first transparent electrode layer 12A and the second transparent electrode layer 12B. In the first transparent electrode layer 12A, the driving electrode element 30 is located in the drive region 20, and the floating electrode element 31 is located in the floating region 22. In other words, the driving electrode element 30 and the floating electrode element 31 are separate layered members formed along the support surface 130 of the first transparent support layer 13A.

The driving electrode element 30 and the floating electrode element 31 are separated from each other by a groove 120. The depth direction of the groove 120 is the thickness direction of the first transparent electrode layer 12A. In the present embodiment, the groove 120 has an opening 122 in a portion of the first transparent electrode layer 12A facing the light control layer 11, and passes through the first transparent electrode layer 12A and extends halfway in the thickness direction of the first transparent support layer 13A. The driving electrode element 30 and the floating electrode element 31 are insulated from each other by being separated by the groove 120. The boundary region 23 is a region in which the groove 120 is located.

Figure 4:
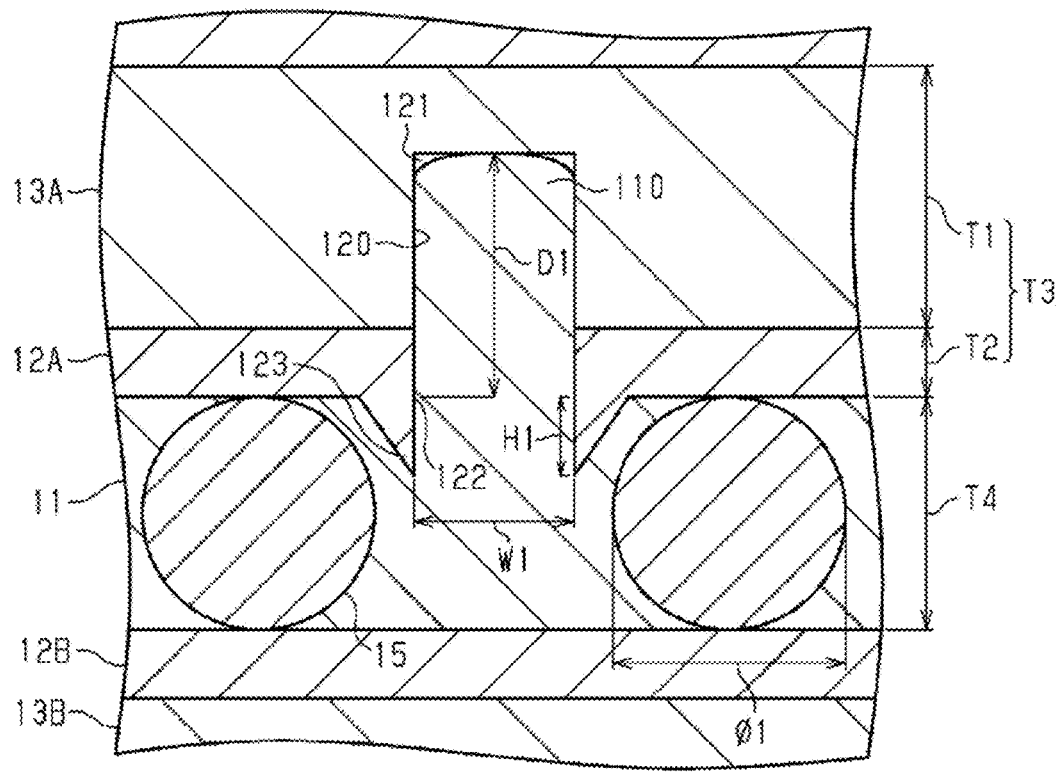
FIG. 4 is an enlarged view of a cross-sectional structure of a light control sheet according to an embodiment of the present invention.

FIG. 4 is an enlarged view of a cross-sectional structure of the groove 120 and a portion of the light control sheet 10 around the groove 120 in FIG. 3. A thickness T3, which is the sum of a thickness T1 of the first transparent support layer 13A and a thickness T2 of the first transparent electrode layer 12A, is 20 µm or more and 200 µm or less. The thickness T2 of the first transparent electrode layer 12A is several tens of nanometers. The light control layer 11 has a thickness of 0.5 µm or more and 460 µm or less. The thickness of the entire light control sheet 10 is 45 µm or more and 500 µm or less. The thickness of the second transparent support layer 13B may be the same as or different from the thickness of the first transparent support layer 13A. Similarly, the thickness of the second transparent electrode layer 12B may be the same as or different from the thickness of the first transparent electrode layer 12A.

The depth of the groove 120 satisfies "T2<D1<T3", where "D1" is the depth of the groove 120. As described above, the groove 120 has a depth that allows the groove 120 to pass through the first transparent electrode layer 12A but not to pass through the first transparent support layer 13A.

The groove 120 has a width W1 smaller than a diameter φ1 of the spacer 15 (width W1<diameter φ1). When there is a variation in the particle diameter of the spacer 15, the diameter φ1 of the spacer 15 is the diameter of the spacer 15 having the smallest particle diameter. The diameter φ1 of the spacer 15 is larger than the width W1 of the groove 120; thus, the spacer 15 is less likely to enter the groove 120.

Figure 5:
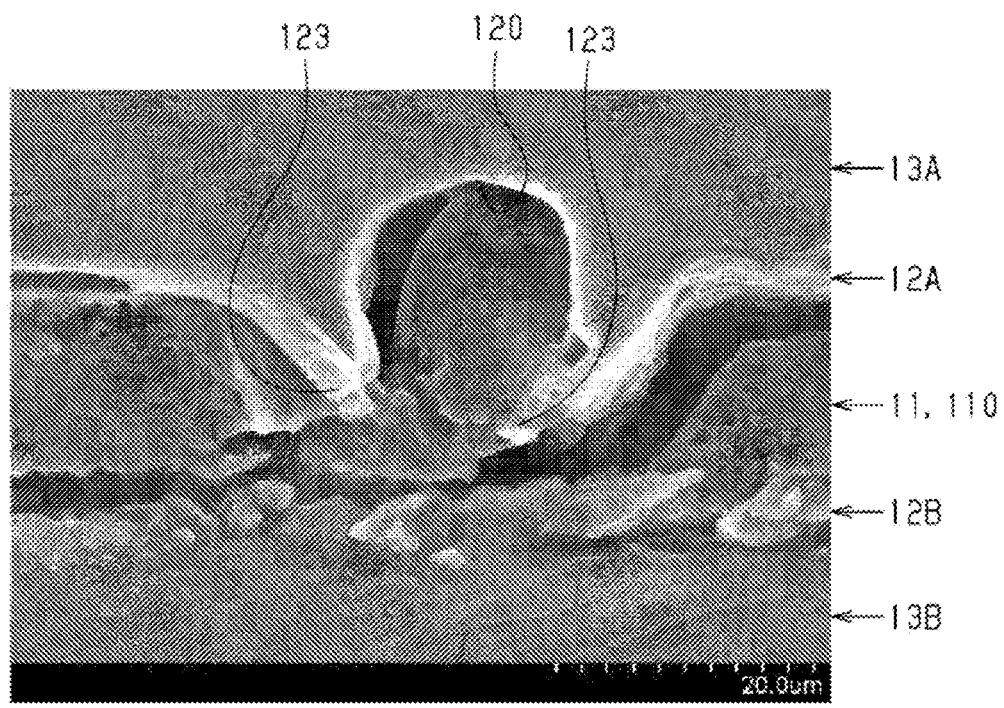
FIG. 5 is an SEM photograph showing a cross-sectional structure of a light control sheet according to an embodiment of the present invention.

FIG. 5 is an SEM photograph of a cross-sectional structure including the groove 120. The groove 120 shown at the center of the photograph is opened on the light control layer 11 side; thus, the groove 120 is filled with a light control material 110 composed of the transparent polymer layer and the liquid crystal composition of the light control layer 11. If the light control material 110 is not filled in the groove 120, light that is transmitted through the first transparent support layer 13A and is incident on the inside of the groove 120 is reflected by a side surface of the groove 120. In this case, the groove 120 is conspicuous when viewed from the outside of the light control sheet 10. On the other hand, in the case where the groove 120 is filled with the light control material 110 as in the present embodiment, the groove 120 is less likely to be visually recognized when viewed from the outside of the light control sheet 10. This is because in such a case, the side surface of the groove 120 has a low reflectance due to the refractive index of the material constituting the first transparent support layer 13A being closer to the refractive index of the light control material 110 than to the refractive index of air. Even if a small void 121 (see FIG. 4) remains in the groove 120, when most part of the groove 120 is filled with the light control material 110, the groove 120 is less conspicuous. In order to obtain an effect in which the groove 120 is less likely to be visually recognized from the outside, the filling ratio of the light control material 110 in the groove 120 may preferably be 80% or more.

As described above, the width W1 of the groove 120 is smaller than the diameter φ1 of the spacers 15; thus, it is possible to prevent the spacers 15 from entering the groove 120 and interfere with filling of the groove 120 with the light control material 110. Furthermore, the thickness of the light control layer 11 is 0.5 μm or more; thus, the light control material 110 is more likely to be filled in the groove 120 at a filling ratio of 80% or more. Although the reason is still unknown, presumably, the light control layer 11 having a large thickness ensures a sufficient amount of light control material 110 around the opening 122. Therefore, the light control material 110 is more likely to be filled in the groove 120 when a predetermined pressure is applied to the light control layer 11 sandwiched between the first transparent electrode layer 12A and the second transparent electrode layer 12B.

Furthermore, the first transparent electrode layer 12A has a burr 123 formed around the opening 122 of the groove 120. The burr 123 is generated when the groove 120 is formed in the first transparent electrode layer 12A, and the burr 123 protrudes from the periphery of the opening 122 toward the light control layer 11. When the groove 120 is formed, the burr 123 is adjusted to have a height H1 (see FIG. 4) smaller than a thickness T4 (see FIG. 4) of the light control layer 11 (H1<T4). If the height H1 of the burr 123 exceeds the thickness T4 of the light control layer 11, the first transparent electrode layer 12A is in contact with the second transparent electrode layer 12B via the light control layer 11, causing a short circuit between the first transparent electrode layer 12A and the second transparent electrode layer 12B. The height H1 of the burr 123 may be 0.8 times or less of the thickness T4 of the light control layer 11. In such a case, even when, for example, the light control sheet 10 is adhered to a curved surface or the light control sheet 10 is unintentionally pressed, and the distance between the first transparent electrode layer 12A and the second transparent electrode layer 12B is reduced, it is possible to sufficiently prevent a short circuit between the first transparent electrode layer 12A and the second transparent electrode layer 12B. The depth D1 of the groove 120 is the length of the groove 120 extending in the thickness direction of the first transparent electrode layer 12A from a surface of the first transparent electrode layer 12A on the light control layer 11 side, and does not include the height of the burr 123.

Method of Producing Light Control Sheet

Figure 6:
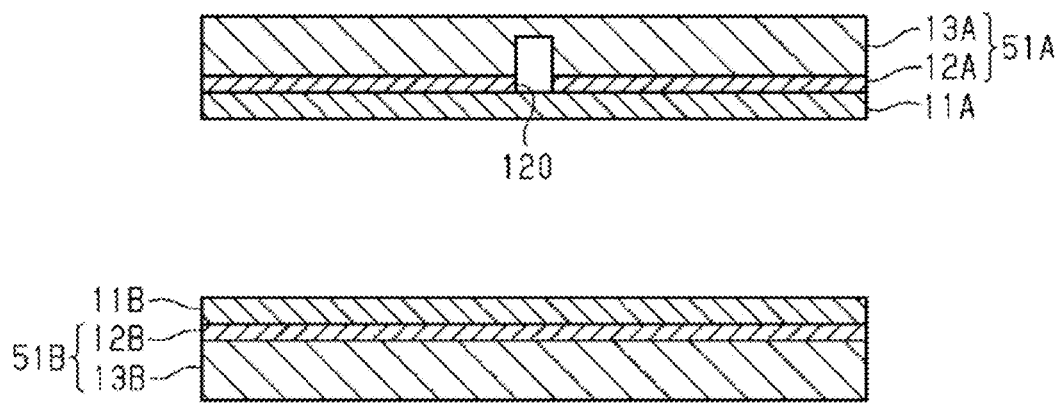
FIG. 6 is a schematic diagram showing a step included in a method of producing a light control sheet according to an embodiment of the present invention.

Next, a method of producing the light control sheet 10 will be described with reference to FIG. 6.

First, a film 51A including the first transparent electrode layer 12A and the first transparent support layer 13A, and a film 51B including the second transparent electrode layer 12B and the second transparent support layer 13B are prepared. Of these, a cutting plotter is brought into contact with the first transparent electrode layer 12A of the film 51A including the first transparent electrode layer 12A and the first transparent support layer 13A to form the groove 120. A control device connected to the cutting plotter causes the cutting plotter to form the groove 120 along a design input in advance.

A device other than the cutting plotter may be used to form the groove 120. For example, a laser cutting device may be used to form the groove 120 in the first transparent electrode layer 12A. The laser cutting device may be, for example, a laser cutter including a $CO_2$ laser.

Then, a liquid material including the spacers 15 containing divinylbenzene or the like as a main material and a dispersion medium for dispersing the spacers 15 is applied to a surface of the film 51A on the first transparent electrode layer 12A side and a surface of the film 51B on the second transparent electrode layer 12B side. Furthermore, the films on which the spacers 15 are scattered are heated to remove the dispersion medium. At this time, the spacers 15 may be scattered on only one of the films.

A light control material containing a transparent polymer material and a liquid crystal composition is applied to the first transparent electrode layer 12A of the film 51A having the groove 120 and to the second transparent electrode layer 12B of the film 51B having no groove 120. At this time, as shown in FIG. 6, the groove 120 may not be filled with the light control material. Furthermore, the films 51A and 51B are irradiated with ultraviolet light under a nitrogen atmosphere to form light control layers 11A and 11B, respectively. The pair of films obtained in this manner are laminated and attached together while a predetermined amount of pressure is applied to the films. Thus, the groove 120 is filled with the light control material.

The light control sheet 10 may be formed either by a roll-to-roll method or a single-sheet production process. In the roll-to-roll method, a film transferred from a roll on the upstream side is subjected to various steps and then wound around a roll on the downstream side. In the single-sheet production process, a film cut into a predetermined size is subjected to various steps. In either of the cases, the step of forming the groove 120 is performed before the film composed of the first transparent electrode layer 12A and the first transparent support layer 13A and the film composed of the second transparent electrode layer 12B and the second transparent support layer 13B are attached together via the light control layer 11.

Then, a slit is made in a corner portion of the second surface 11R of the light control sheet having a predetermined size, and the second transparent support layer 13B and the second transparent electrode layer 12B in the corner portion are peeled off. Furthermore, the light control layer 11 in the corner portion is removed to expose the first transparent electrode layer 12A to form the connection region 24. Similarly, the connection region 24 is formed in a corner portion of the first surface 11F. Then, the first terminal portion 50A and the second terminal portion 50B are formed, and the external wires 25 are connected to the connection region 24. Furthermore, the connection region 24 is sealed with an epoxy resin or the like. The step of attaching the protective layer 44 to the first transparent support layer 13A may be performed after the pair of films are attached together.

Thus, making a slit in the first transparent electrode layer 12A and the first transparent support layer 13A to form the groove 120 enables simpler formation of the groove 120 compared with, for example, a production method including steps such as formation of a resist mask required for patterning, exposure, development, etching, removal of the resist mask, and washing.

Figure 7:
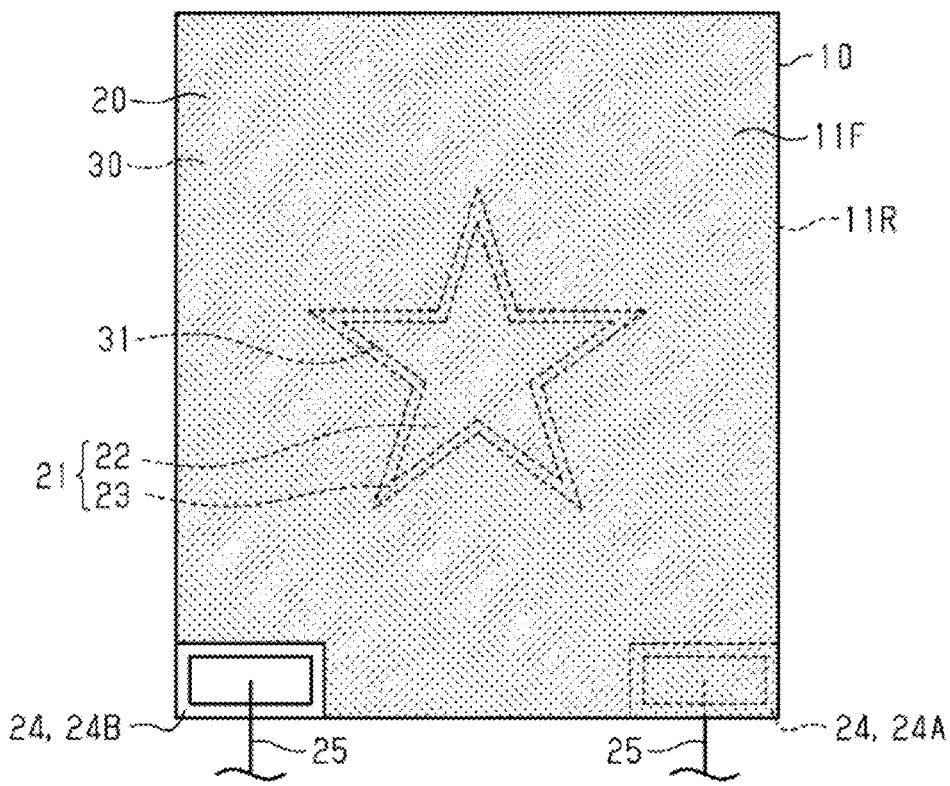
FIG. 7 is a front view of a light control sheet according to an embodiment of the present invention when the light control sheet is not driven.

Next, effects of the present embodiment will be described with reference to FIG. 7. FIG. 7 schematically shows the degree of transparency of the light control sheet 10 when the light control sheet 10 is not driven, that is, when no voltage signal is applied to the first transparent electrode layer 12A or the second transparent electrode layer 12B. When the light control sheet 10 is not driven, the drive region 20 and the non-driven region 21 are both opaque. Therefore, the entire surface of the light control sheet 10 appears, for example, whitish and turbid, and an image of the character, pattern, or the like composed of the non-driven region 21 is not visually recognized.

The groove 120 has a depth that allows the groove 120 to pass through the first transparent electrode layer 12A but not to pass through the first transparent support layer 13A; thus, the groove 120 is not conspicuous when viewed from either the first surface 11F or the second surface 11R of the light control sheet 10. In addition, when the groove 120 is filled with the light control material, the groove 120 is even less likely to be visually recognized. This allows the light control sheet 10 to have a better aesthetic appearance when the design is displayed.

As shown in FIG. 1, when the light control sheet 10 is driven, the drive region 20 is transparent and the non-driven region 21 is opaque. Therefore, only the non-driven region 21 appears, for example, whitish and turbid, and an image of the design such as a character or pattern composed of the non-driven region 21 can be visually recognized.

Thus, in the light control sheet 10 of the present embodiment, the surface of the light control sheet 10 has the regions different in light transmittance to each other, and the difference in light transmittance between the regions is shown only when the light control sheet 10 is driven. Therefore, when the light control sheet 10 is driven, an image of the character, pattern, or the like composed of the non-driven region 21 is visually recognized, enabling decoration of a space in which the light control sheet 10 is provided. Furthermore, by switching the light control sheet 10 between the driven state and the non-driven state, the light control sheet 10 can be switched between the state in which the image is displayed and the state in which the image is not displayed, enabling a dynamic change in the decoration state of the space. This allows the light control sheet to have higher designability.

As described above, the above embodiment provides the advantages listed below.

(1) By applying a voltage signal only to one of the driving electrode element 30 and the floating electrode element 31 or by applying voltage signals different to each other to the driving electrode element 30 and the floating electrode element 31, it is possible to cause the region in the light control sheet 10 in which the driving electrode element 30 is located and the region in the light control sheet 10 in which the floating electrode element 31 is located to be different in light transmittance. Thus, the light control sheet 10 can be switched between the state in which no voltage signal is applied to either the driving electrode element 30 or the floating electrode element 31 and there is no difference in light transmittance between the regions in which the respective electrode elements are located and the state in which there is a difference in light transmittance between the regions in which the respective electrode elements are located as described above. This allows the light control sheet 10 to have higher designability. The groove 120 has a depth that allows the groove 120 to pass through the first transparent electrode layer 12A but not to pass through the first transparent support layer 13A, enabling the groove 120 to be less conspicuous when the light control sheet 10 is viewed from the first transparent electrode layer 12A side. This allows the light control sheet 10 to have a better aesthetic appearance. Furthermore, this enables simpler formation of the groove 120 compared with, for example, a method including a step of removing the first transparent electrode layer 12A by etching or the like.

(2) A part of the light control layer 11 is filled in at least a part of the groove 120; thus, the groove 120 is less likely to be visually recognized when the light control sheet 10 is viewed from the first transparent support layer 13A side or the second transparent support layer 13B side.

(3) The groove 120 is even less likely to be visually recognized when the light control material is filled in the groove 120 at a filling ratio of 80% or more.

(4) The inner diameter of the opening 122 of the groove 120 is smaller than the diameter of the spacer 15; thus, it is possible to prevent the spacer 15 from entering the groove 120. Therefore, the spacers 15 are less likely to enter the groove 120 and interfere with filling of the groove 120 with the light control layer 11.

(5) The burr 123 located around the opening 122 of the groove 120 has a height smaller than the thickness of the light control layer 11; thus, it is possible to prevent a tip of the burr 123 formed in the first transparent electrode layer 12A from being in contact with the second transparent electrode layer 12B via the light control layer 11. This can prevent a short circuit between the first transparent electrode layer 12A and the second transparent electrode layer 12B.

(6) The groove 120 has a closed frame shape surrounding the floating electrode element 31. Since the groove 120 having a closed frame shape can define the floating electrode element 31, the layout constraints of the floating electrode element 31 can be reduced.

Modifications

The above embodiment can be implemented with modifications as described below. The following modifications may be implemented in combination.

Figure 8:
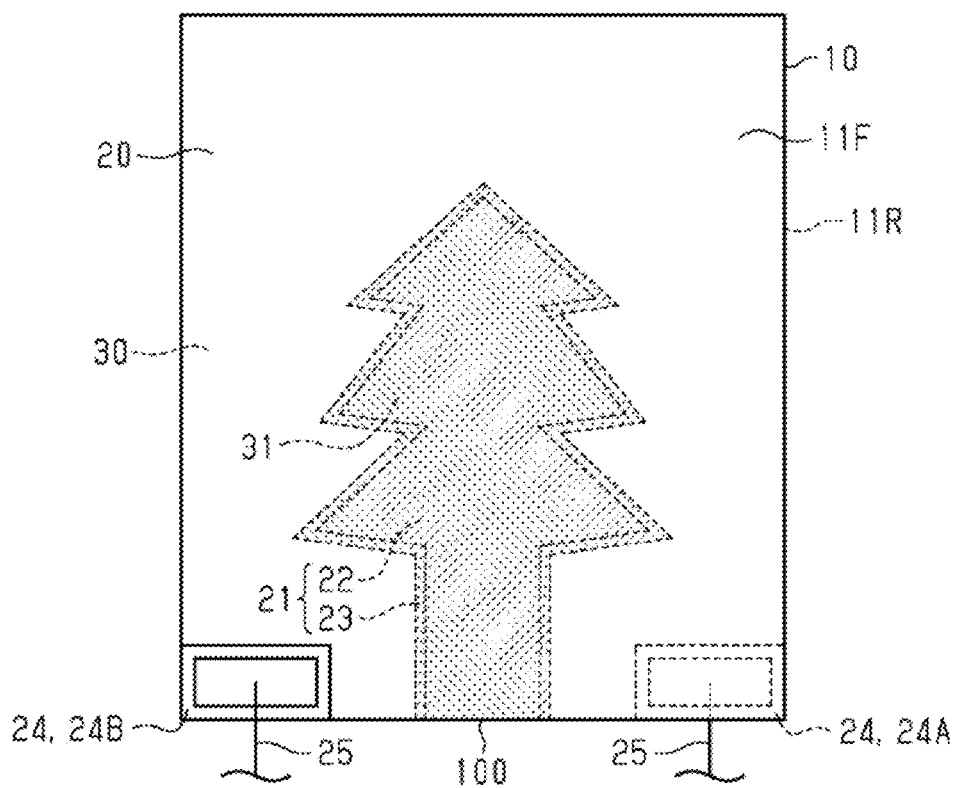
FIG. 8 is a front view of a light control sheet of a modification when a light control sheet according to an embodiment of the present invention is driven.

In the above embodiment, the groove 120 has a closed frame shape surrounding the floating electrode element 31. Instead of or in addition to this, the groove 120 may not have a closed frame shape surrounding the floating electrode element 31 as long as the groove 120 extends along the support surface 130 of the first transparent support layer 13A. For example, as shown in FIG. 8, when viewed from a position perpendicular to the first surface 11F, the boundary region 23 and the groove 120 may extend from a starting point located at an end portion 100 of the light control sheet 10 through an outer periphery of the floating region 22 and the floating electrode element 31 to an end point located at the end portion 100 of the light control sheet 10. In such a case, end portions of the floating region 22 and the floating electrode element 31 are located at the end portion 100 of the light control sheet 10. FIG. 8 shows the end portion 100 as the lower side in FIG. 8 of the light control sheet 10 having a rectangular shape; however, the end portion 100 serving as the starting point and the end point of the boundary region 23 and the groove 120 may be any of the upper side, left side, and right side of the light control sheet 10, or may be the sides of the light control sheet 10.

In the above embodiment, the light control sheet 10 is a normal-type light control sheet; however, the light control sheet 10 may be a reverse-type light control sheet in which when no voltage signal is applied to the light control sheet, incident light is transmitted through the light control sheet to increase translucency of the light control sheet and when a voltage signal is applied to the light control sheet, incident light is scattered to decrease translucency of the light control sheet.

Figure 9:
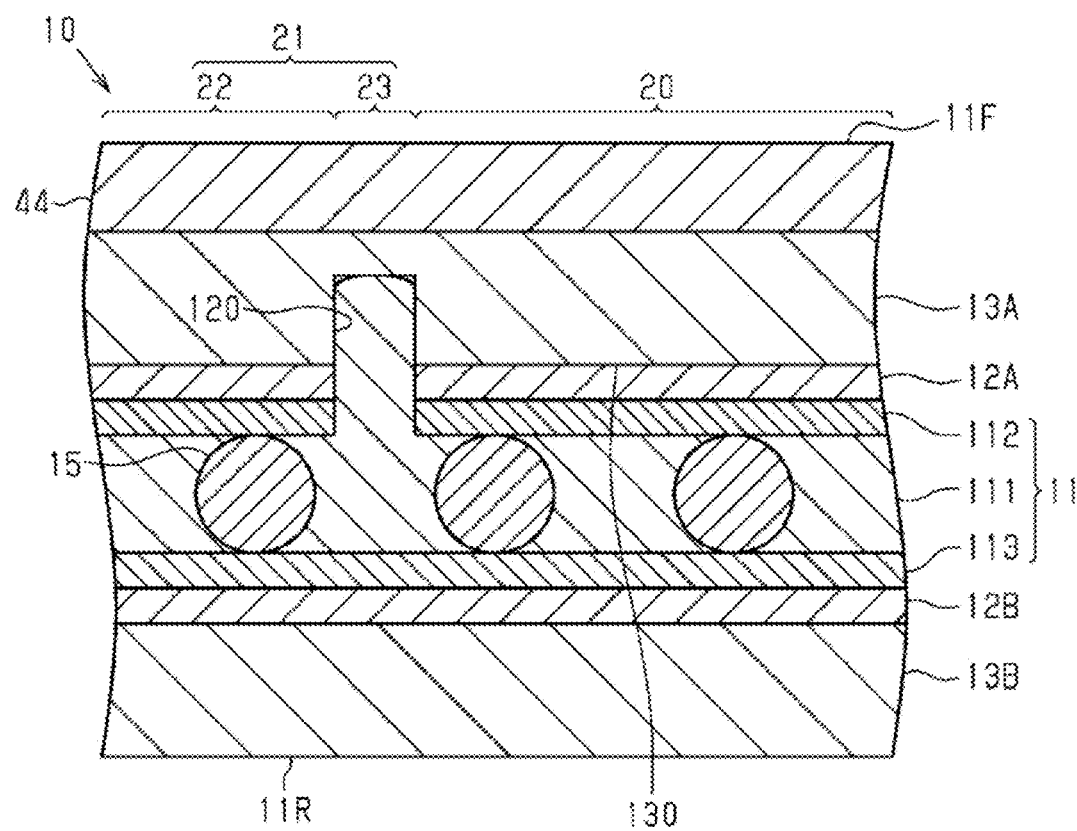
FIG. 9 is a cross-sectional view of a light control sheet of a modification.

FIG. 9 shows an example of the light control sheet 10 as a reverse-type light control sheet. As shown in FIG. 9, the light control layer 11 of the light control sheet 10 as a reverse-type light control sheet has a multilayer structure, and includes a functional layer 111 including a transparent polymer layer and a liquid crystal composition, a first alignment layer 112, and a second alignment layer 113. The first alignment layer 112 and the second alignment layer 113 constitute the light control layer 11. The first alignment layer 112 is located between the functional layer 111 and the first transparent electrode layer 12A and is in contact with these layers. The second alignment layer 113 is located between the functional layer 11 and the second transparent electrode layer 12B and is in contact with these layers.

The first alignment layer 112 and the second alignment layer 113 are each, for example, a vertical alignment film or a horizontal alignment film. A vertical alignment film causes the major axes of liquid crystal molecules to be aligned in the thickness direction of the light control layer 11. A horizontal alignment film causes the major axes of liquid crystal molecules to be aligned in a direction substantially perpendicular to the thickness direction of the light control layer 11. Thus, the first alignment layer 112 and the second alignment layer 113 control the alignment of the liquid crystal molecules contained in the light control layer 11.

The material for forming each of the first alignment layer 112 and the second alignment layer 113 is an organic compound, an inorganic compound, or a mixture thereof. Examples of the organic compound include polyimide, polyamide, polyvinyl alcohol, and cyanide compounds. Examples of the inorganic compound include silicon oxide and zirconium oxide. The material for forming the first alignment layer 112 and the second alignment layer 113 may be silicone. Silicone is a compound having an inorganic portion and an organic portion.

The groove 120 has the opening 122 in a portion of the first alignment layer 112 facing the functional layer 111 and passes through the first alignment layer 112 and the first transparent electrode layer 12A but does not pass through the first transparent support layer 13A. That is, the depth of the groove 120 is smaller than the sum of the thickness of the first alignment layer 112, the thickness of the first transparent electrode layer 12A, and the thickness of the first transparent support layer 13A. The groove 120 is filled with a part of the functional layer 111.

In the drive region 20 of the light control sheet 10 including the first alignment layer 112 and the second alignment layer 113, when no voltage signal is applied to the transparent electrode layer 12A or 12B, the major axes of the liquid crystal molecules are aligned in the thickness direction of the light control layer 11. Thus, the drive region 20 is transparent. On the other hand, in the drive region 20, when a voltage signal is applied to the transparent electrode layers 12A and 12B, the major axes of the liquid crystal molecules are aligned in a direction intersecting the thickness direction of the light control layer 11. Thus, the drive region 20 appears turbid and opaque. In the floating region 22 and the boundary region 23 of the light control sheet 10 including the first alignment layer 112 and the second alignment layer 113, the major axes of the liquid crystal molecules are constantly aligned in the thickness direction of the light control layer 11; thus, the non-driven region 21 is constantly transparent.

Therefore, when the light control sheet 10 is not driven, the drive region 20 and the non-driven region 21 are both transparent, and an image of the character, pattern, or the like composed of the non-driven region 21 is not visually recognized. On the other hand, when the light control sheet 10 is driven, the drive region 20 is opaque and the non-driven region 21 is transparent; thus, an image of the character, pattern, or the like composed of the non-driven region 21 can be visually recognized.

Thus, even in the light control sheet 10 including the first alignment layer 112 and the second alignment layer 113, the surface of the light control sheet 10 has the regions different in light transmittance to each other, and the difference in light transmittance between the regions is shown only when the light control sheet 10 is driven. Accordingly, this allows the light control sheet 10 to have higher designability.

In the above aspect, the groove 120 passes through the first alignment layer 112; however, the first alignment layer 112 may be formed after the groove 120 is formed in a laminate composed of the first transparent electrode layer 12A and the first transparent support layer 13A. In such a case, the first alignment layer 112 is formed along the bottom surface and side surface of the groove 120. This also enables the groove 120 to be less conspicuous when viewed externally.

In the above embodiment, a voltage signal is applied to the driving electrode element 30 which is the first electrode element, and no voltage signal is applied to the floating electrode element 31 which is the second electrode element. Instead, a voltage signal may be separately applied to the first electrode element and the second electrode element. In such a case, a wire for applying a voltage signal to the second electrode element is connected to an end portion of the second electrode element. A terminal portion connected to the first electrode element and a terminal portion connected to the second electrode element are different terminal portions for the respective voltage signals. As described above, in the configuration in which the second electrode element is located at the end portion of the light control sheet 10, a wire is easily connected to the second electrode element.

For example, a first region in which the first electrode element is located is switched between the transparent state and the opaque state by switching the application state of a voltage signal to the first electrode element. A second region in which the second electrode element is located is switched between the transparent state and the opaque state independently from the first region by switching the application state of a voltage signal to the second electrode element. Such a configuration allows the light control sheet 10 to be switched among four states: the state in which the first region and the second region are both opaque, the state in which the first region is opaque and the second region is transparent, the state in which the first region is transparent and the second region is opaque, and the state in which the first region and the second region are both opaque. This enables the decoration state of the space by the light control sheet 10 to be more variously changed, allowing the light control sheet 10 to have even higher designability.

The light transmittance of at least one of the first region and the second region may be controlled to be a light transmittance between the light transmittance at which the region is transparent and the light transmittance at which the region is opaque. In the light control sheet 10 including the light control layer 11 containing a liquid crystal composition, when the potential difference between the transparent electrode layers 12A and 12B is in a predetermined range, the light transmittance of the light control sheet 10 is gradually changed according to a change in the potential difference. Thus, in the first region or the second region, by controlling the potential difference between the transparent electrode layers 12A and 12B to be a value between the potential difference at which the region is transparent and the potential difference at which the region is opaque, it is possible to control the region to have a light transmittance between the light transmittance at which the region is transparent and the light transmittance at which the region is opaque, that is, it is possible to control the region to be translucent.

Specifically, for example, the first region is switched between the transparent state and the opaque state by switching the application state of a voltage signal to the first electrode element, and the second region is switched between the translucent state and the opaque state by switching the application state of a voltage signal to the second electrode element. When the first region is transparent, the second region is controlled to be translucent. Such a configuration enables the light control sheet 10 to be switched between the state in which the first region and the second region are both opaque and the state in which the first region is opaque and the second region is translucent. This also allows the light control sheet 10 to have higher designability.

A light control sheet includes a light control layer containing a liquid crystal composition, and a pair of transparent electrode layers sandwiching the light control layer. A drive voltage is applied between the pair of transparent electrode layers. The alignment of liquid crystal molecules of the liquid crystal composition changes according to a potential difference between the transparent electrode layers, leading to a change in light transmittance of the light control sheet. For example, when the major axes of the liquid crystal molecules are aligned in the thickness direction of the light control layer, the light control sheet is colorless and transparent, and has a high light transmittance. When the major axes of the liquid crystal molecules intersect the thickness direction of the light control layer, light is scattered in the light control layer, and the light transmittance of the light control sheet is low (see, for example, JP 2018-45135 A).

Light control sheets are adhered to members for partitioning a space, for example, construction materials such as window glasses or partitions of buildings, or window glasses of vehicles, and are used as a part of such members. In recent years, in order to improve the added value of light control sheets, the designability of light control sheets has been attracting attention. Improvement in the designability of light control sheets can significantly increase the applicability of light control sheets and create a new demand for a space to be light controlled. Thus, light control sheets having higher designability are to be developed.

An aspect of the present disclosure provides a light control sheet. The light control sheet includes a first transparent electrode layer, a second transparent electrode layer, a light control layer that is located between the first transparent electrode layer and the second transparent electrode layer, a first transparent support layer that is located on a side of the first transparent electrode layer facing away from the light control layer and has a support surface that supports the first transparent electrode layer, and a second transparent support layer that is located on a side of the second transparent electrode layer facing away from the light control layer, wherein the first transparent electrode layer includes a first electrode element and a second electrode element, the first electrode element and the second electrode element are separate layered members formed along the support surface, and are electrically insulated from each other by a groove extending along the support surface, a depth direction of the groove is a thickness direction of the first transparent electrode layer, and the groove has a depth that allows the groove to pass through the first transparent electrode layer but not to pass through the first transparent support layer.

Another aspect of the present disclosure provides a method of producing a light control sheet. The method of producing a light control sheet includes preparing a laminate including a first transparent support layer and a first transparent electrode layer supported by the first transparent support layer and making a slit in the first transparent electrode layer and the first transparent support layer from a side where the first transparent electrode layer is located to form a groove in order to form a first electrode element and a second electrode element formed by the groove in the first transparent electrode layer, the groove having a depth that allows the groove to pass through the first transparent electrode layer but not to pass through the first transparent support layer, and forming a light control layer between the laminate having the groove and a laminate including a second transparent support layer and a second transparent electrode layer supported by the second transparent support layer.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
a plurality of transparent electrode layers comprising a first transparent electrode layer and a second transparent electrode layer;
a light control layer formed between the first transparent electrode layer and the second transparent electrode layer;
a first transparent support layer formed on the first transparent electrode layer on an opposite side with respect to the light control layer; and
a second transparent support layer formed on the second transparent electrode layer on an opposite side with respect to the light control layer,
wherein the first transparent support layer has a support surface supporting the first transparent electrode layer, and the first transparent electrode layer has a groove and includes a first electrode element and a second electrode element formed along the support surface of the first transparent support layer and electrically insulated from each other by the groove such that the groove is extending along the support surface of the first transparent support layer and has a depth penetrating through the first transparent electrode layer and extending into a portion of the first transparent support layer.

2. The light control sheet according to claim 1, wherein the groove has an opening on a surface of the first transparent electrode layer facing the light control layer such that a part of a light control material of the light control layer is filling at least a part of the groove.

3. The light control sheet according to claim 2, wherein the light control layer is formed such that 80% or more of a space in the groove is filled by the part of the light control material.

4. The light control sheet according to claim 2, wherein the light control layer includes a spacer, and the groove has a width smaller than a diameter of the spacer.

5. The light control sheet according to claim 1, wherein the groove has an opening on a surface of the first transparent electrode layer facing the light control layer, and a burr formed around the opening of the groove has a height smaller than a thickness of the light control layer.

6. The light control sheet according to claim 1, wherein the groove has a closed frame shape surrounding the second electrode element.

7. The light control sheet according to claim 1, wherein the light control layer is formed such that a part of a light control material of the light control layer is filling a portion of the groove formed in the first transparent support layer.

8. The light control sheet according to claim 3, wherein the light control layer includes a spacer, and the groove has a width smaller than a diameter of the spacer.

9. The light control sheet according to claim 2, wherein the groove has an opening on a surface of the first transparent electrode layer facing the light control layer, and a burr formed around the opening of the groove has a height smaller than a thickness of the light control layer.

10. The light control sheet according to claim 2, wherein the groove has a closed frame shape surrounding the second electrode element.

11. The light control sheet according to claim 2, wherein the light control layer is formed such that a part of the light control material of the light control layer is filling a portion of the groove formed in the first transparent support layer.

12. The light control sheet according to claim 3, wherein the groove has an opening on a surface of the first transparent electrode layer facing the light control layer, and a burr formed around the opening of the groove has a height smaller than a thickness of the light control layer.

13. The light control sheet according to claim 3, wherein the groove has a closed frame shape surrounding the second electrode element.

14. The light control sheet according to claim 3, wherein the light control layer is formed such that the part of the light control material of the light control layer is filling a portion of the groove formed in the first transparent support layer.

15. The light control sheet according to claim 4, wherein the groove has an opening on a surface of the first transparent electrode layer facing the light control layer, and a burr formed around the opening of the groove has a height smaller than a thickness of the light control layer.

16. The light control sheet according to claim 4, wherein the groove has a closed frame shape surrounding the second electrode element.

17. The light control sheet according to claim 4, wherein the light control layer is formed such that a part of the light control material of the light control layer is filling a portion of the groove formed in the first transparent support layer.

18. The light control sheet according to claim 5, wherein the groove has a closed frame shape surrounding the second electrode element.

19. The light control sheet according to claim 5, wherein the light control layer is formed such that a part of a light control material of the light control layer is filling a portion of the groove formed in the first transparent support layer.

20. A method of producing a light control sheet, comprising:
preparing a first laminate comprising a first transparent support layer and a first transparent electrode layer;
preparing a second laminate comprising a second transparent support layer and a second transparent electrode layer;
making a slit in the first transparent electrode layer and the first transparent support layer such that a groove, a first electrode element, and a second electrode element electrically insulated from the first electrode element by the groove are formed in the first transparent electrode layer along a support surface of the first transparent support layer; and
forming a light control layer between the first laminate comprising the first transparent support layer and the first transparent electrode layer and the second laminate comprising the second transparent support layer and the second transparent electrode layer,
wherein the first transparent electrode layer is supported by the first transparent support layer, the second transparent electrode layer is supported by the second transparent support layer, and the slit is made in the first transparent electrode layer and the first transparent support layer from a side where the first transparent electrode layer is formed such that the groove has a depth penetrating through the first transparent electrode layer and extending into a portion of the first transparent support layer.

* * * * *